US012425099B2

(12) United States Patent
Barthe

(10) Patent No.: US 12,425,099 B2
(45) Date of Patent: Sep. 23, 2025

(54) DEVICE AND METHOD FOR SYNCHRONIZING SYMBOL TIME WITH PARALLEL ARCHITECTURE

(71) Applicant: AIRBUS DEFENCE AND SPACE SAS, Toulouse (FR)

(72) Inventor: Lyonel Barthe, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 0 days.

(21) Appl. No.: 18/996,798

(22) PCT Filed: Jun. 21, 2023

(86) PCT No.: PCT/EP2023/066819
§ 371 (c)(1),
(2) Date: Jan. 17, 2025

(87) PCT Pub. No.: WO2024/017554
PCT Pub. Date: Jan. 25, 2024

(65) Prior Publication Data
US 2025/0260484 A1  Aug. 14, 2025

(30) Foreign Application Priority Data
Jul. 22, 2022  (FR) ...................................... 2207529

(51) Int. Cl.
*H04B 7/185*  (2006.01)
*H04W 56/00*  (2009.01)
(52) U.S. Cl.
CPC ...... *H04B 7/18578* (2013.01); *H04W 56/001* (2013.01)

(58) Field of Classification Search
CPC .................. H04B 7/18578; H04W 56/001
See application file for complete search history.

(56) References Cited

U.S. PATENT DOCUMENTS

2017/0223646 A1\* 8/2017 Romera ................ H04L 7/02
2021/0218488 A1\* 7/2021 Zhang ................ H04W 84/18

OTHER PUBLICATIONS

Daniel Schmidt et al., "Parallel Architecture of an All Digital Timing Recovery Scheme for High Speed Receivers", Communication Systems Networks and Digital Signal Processing (CSNDSP), 2010 7th International Symposium, Jul. 21, 2010, pp. 31-34.

(Continued)

*Primary Examiner* — Kyaw Z Soe
(74) *Attorney, Agent, or Firm* — Nixon & Vanderhye P.C.

(57) ABSTRACT

A symbol time synchronization device with parallel architecture is disclosed having a sample storage and reordering module including a control unit and 2×P cyclically ordered FIFOs, an interpolation module configured to supply, at each clock stroke, a time error indication (Err-Ind) taking one of the values "Nominal", "Underrun" or "Overrun", at a current clock stroke, the control unit is configured to write a sample to each of P successive FIFOs, read a sample from each of P, P−1, or P+1 successive FIFOs depending on whether the time error indication (Err-Ind) is respectively "nominal", "underrun" or "overrun", reorder samples to be supplied to the interpolation module using a permutation network.

14 Claims, 8 Drawing Sheets

(56) References Cited

OTHER PUBLICATIONS

Xin Hao et al., "Parallel Timing Synchronization Algorithm and Its Implementation in High Speed Wireless Communication Systems", 2019 International Conference on Electronics, Information, and Communication (ICEIC), Institute of Electronics and Information Engineers (IEIE), Jan. 22, 2019, 6 pages.

International Search Report with English translation, and Written Opinion of the ISA for PCT/EP2023/066819, mailed Oct. 4, 2023, 10 pages.

\* cited by examiner

DEVICE AND METHOD FOR SYNCHRONIZING SYMBOL TIME WITH PARALLEL ARCHITECTURE

CROSS REFERENCE TO RELATED APPLICATIONS

The present application is a National Phase of International Application Number PCT/EP2023/066819 filed Jun. 21, 2023, which designated the U.S. and claims priority benefits from French Application Number FR 2207529 filed Jul. 22, 2022, the entire contents of each of which are hereby incorporated by reference.

FIELD OF THE INVENTION

The present invention belongs to the field of digital communications, especially by satellite, and more particularly concerns a device and method for synchronizing symbol time with a parallel architecture. The invention is particularly well adapted to a high-rate communications system between a satellite and an earth station.

STATE OF THE ART

In digital communications systems, a transmitter device transmits a message to a receiver device in the form of a signal carrying a sequence of symbols. A symbol may correspond to one bit or a set of data bits. For example, a symbol may correspond to a particular phase, amplitude and/or frequency value of the signal, depending on the modulation used. At the receiver device, the signal received is sampled and the symbols are to be synchronized from samples obtained (one symbol corresponds to several samples).

The symbol time at the transmitter device is clocked from a clock belonging to the transmitter device. The symbol time at the receiver device is clocked from a clock belonging to the receiver device. However, a time bias may exist between the clock of the transmitter device and the clock of the receiver device, due to the imperfection of the oscillators forming these clocks. Time errors can also be introduced by the Doppler effect, due to a variation in the relative speed of the transmitter device in relation to the receiver device (this is particularly true for communication between a low-orbit satellite and a ground station). These time errors can lead to errors in determining instants of the symbols during sampling. This can result in errors in symbol decoding, and potentially in an inability to decode the message received.

There are various methods for synchronizing symbol times. It is especially possible to use a method based on Gardner algorithm, or a method based on Oerder and Meyr algorithm. These algorithms are especially used in space communications based on SCPC (Single Channel Per Carrier) technology, such as, for example, for the DVB-S2X system (Digital Video Broadcasting—Second Generation Satellite Extensions, a broadcasting standard for digital satellite television). For these technologies, the symbol time synchronization device generally has a serial architecture.

The CCSDS (Consultative Committee for Space Data Systems) is currently defining a communications standard providing data rates in the order of 10 Gbits/s, thus enabling satellites to exchange data with ground stations at very high speeds via an optical link.

To achieve such high speeds, it becomes necessary to use a parallel architecture for the symbol time synchronization device, in order to meet the real-time requirements of FPGA (Field-Programmable Gate Array) or ASIC (Application-Specific Integrated Circuit) technologies.

Parallel architecture, however, introduces a design challenge to resolve time drift at the sample without overcomplicating the receiver device.

Document "*A Parallel Timing Synchronization Structure in Real-Time High Transmission Capacity Wireless Communication Systems*", Xin Hao et al., describes a symbol time synchronization device with a parallel architecture based on Gardner algorithm. It is mentioned in this document that a frequency offset between the transmitter device and receiver device results in a time error that continuously increases or decreases. To correct this time error, it is necessary to remove or keep certain samples when the error has accumulated to some level. It then becomes necessary to rearrange the samples in a correct order. However, this document does not describe an example implementation that enables samples to be rearranged efficiently and effectively.

The following documents also disclose a symbol-time synchronization algorithm based on a parallel architecture:
"Parallel Timing Synchronization Algorithm and Its Implementation in High Speed Wireless Communication Systems", Xin Hao et al., 2010 International Conference on Electronics, Information, and Communication (ICEIC), Institute of Electronics and Information Engineers (IEIE), 22 Jan. 2019;
"Parallel Architecture of an All Digital Timing Recovery Scheme for High Speed Receivers", Daniel Schmidt et al., 2010 7th International Symposium On Communication Systems Networks and Digital Signal Processing (CSNDSP), IEEE, 21 Jul. 2010.

DISCLOSURE OF THE INVENTION

The objective of the present invention is to remedy all or some of the drawbacks of prior art, especially those set out hereinbefore.

To this end, and according to a first aspect, it is provided by the present invention a symbol time synchronization device with parallel architecture. The symbol time synchronization device is configured to be clocked by a clock, and comprises:
a sample storage and reordering module comprising a control unit and 2×P buffers of the "first-in, first-out" type, also known as "FIFOs", P being an even integer greater than or equal to four, each FIFO being able to store several samples, the FIFOs being ordered cyclically;
an interpolation module configured to supply, at each clock stroke, a time error indication determined from samples coming from the storage and reordering module, said time error indication taking one value from "nominal", "underrun" or "overrun".
At a current clock stroke, the control unit is configured to:
write a sample to each of P successive FIFOs that have not been used for writing at the previous clock stroke,
read a sample in each of P, P−1, or P+1 successive FIFOs depending on whether the time error indication is respectively "nominal", "underrun" or "overrun", the FIFOs from which a sample is to be read being defined as a function of the FIFOs from which samples have been read at the previous clock stroke,
reorder samples to be supplied to the interpolation module by means of a permutation network and as a function of a counter whose current value is defined as a function of the value of said counter at the previous clock stroke and as a function of the time error indication at the previous clock stroke.

It should be noted that this is the generic case where the current clock and the previous clock have valid samples. As will be explained in greater detail later, it is possible to manage an indication of the validity of the samples at the clock stroke under consideration, and to perform (or not perform) certain actions according to this validity indication.

The use of a permutation network and its management using a counter updated as a function of the time error indication enables the samples to be supplied to the interpolation module to be dynamically rearranged, using binary rotation operations that are relatively inexpensive in terms of hardware implementation and computation time.

In particular embodiments, the invention may further include one or more of the following characteristics, considered individually or according to any technically possible combination.

In particular embodiments, writing to the FIFOs is controlled by a binary write mask including 2×P bits. Each bit is respectively associated with a FIFO and indicates whether or not said FIFO is to be used for writing. The write mask can take two distinct possible values, each having exactly P bits indicating that the associated FIFOs are to be used for writing, said values having no bits in common. The control unit is configured to change the value of the write mask at each clock stroke (if valid data are available for the clock stroke under consideration).

In particular embodiments, reading from the FIFOs is controlled by three binary read masks, each including 2×P cyclically ordered bits. Each bit is respectively associated with a FIFO and indicates whether or not said FIFO is to be used for reading. Each read mask is respectively associated with one of the three possible values of the time error indication. Each read mask includes exactly P, P−1 or P+1 successive bits indicating that the associated FIFOs are to be used for reading, depending on whether the read mask is respectively associated with the "nominal", "underrun" or "overrun" indication. The control unit is configured, for said current clock stroke, to:
  identify the read mask to be used as a function of the time error indication,
  update each read mask, for the next clock stroke, by performing a binary rotation of the current value of said read mask by P, P−1 or P+1 bits depending on whether the time error indication is respectively "nominal", "underrun" or "overrun".

In particular embodiments, to reorder the samples to be supplied to the interpolation module, the control unit is configured to:
  control the permutation network to perform a binary rotation on said samples by a number of bits defined from the current value of the counter,
  update the counter, for the next clock stroke, by performing a modulo 2×P addition of the current value of the counter with the value P, P−1 or P+1 depending on whether the time error indication is respectively "nominal", "underrun" or "overrun".

According to a second aspect, the present invention relates to a receiver device of a communications device. The receiver device includes a synchronization device according to any of the previous embodiments.

According to a third aspect, the present invention relates to a satellite including such a receiver device.

In particular embodiments, the communications system is a space communications system providing a speed at least equal to 100 Mbits/s.

According to a fourth aspect, the present invention relates to a method for operating a symbol time synchronization device with parallel architecture. The synchronization device is clocked by a clock and comprises:
  a sample storage and reordering module comprising 2×P "first-in, first-out" type buffers or FIFOs, P being an even integer greater than or equal to four, each FIFO being able to store several samples, the FIFOs being ordered cyclically,
  an interpolation module configured to supply, at each clock stroke, a time error indication determined from samples coming from the storage and reordering module, said time error indication taking one value from "nominal", "underrun" or "overrun".

The method includes, at a current clock stroke:
  writing a sample to each of P successive FIFOs that have not been used for writing at the previous clock stroke,
  reading a sample from each of P, P−1 or P+1 successive FIFOs, depending on whether the time error indication is "nominal", "underrun" or "overrun" respectively, the FIFOs from which a sample is to be read being defined as a function of the FIFOs from which samples have been read at the previous clock stroke,
  reordering samples to be supplied to the interpolation module as a function of a counter whose current value is defined as a function of the counter value at the previous clock stroke and as a function of the time error indication at the previous clock stroke,
  supplying the reordered samples to the interpolation module.

In particular implementations, the invention may further include one or more of the following characteristics, taken individually or according to all technically possible combinations.

In particular implementations, writing to FIFOs is controlled by a binary write mask including 2×P bits. Each bit is respectively associated with a FIFO and indicates whether or not said FIFO is to be used for writing. The write mask can take two distinct possible values, each having exactly P bits indicating that the associated FIFOs are to be used for writing, said values having no bits in common. The value of the write mask is changed at each clock stroke.

In particular implementations, reading from FIFOS is controlled by three binary read masks each including 2×P cyclically ordered bits. Each bit is respectively associated with a FIFO and indicates whether or not said FIFO is to be used for reading. Each read mask is respectively associated with one of the three possible values of the time error indication. Each read mask includes exactly P, P−1 or P+1 successive bits indicating that the associated FIFOs are to be used for reading, depending on whether the read mask is respectively associated with the "nominal", "underrun" or "overrun" indication. Reading includes:
  identifying the read mask to be used as a function of the time error indication,
  updating each read mask, for the next clock stroke, by performing a binary rotation of the current value of said read mask by P, P−1, P+1 bits depending on whether the time error indication is respectively "nominal", "underrun" or "overrun".

In particular implementations, reordering samples to be supplied to the interpolation module includes:
  a binary rotation operation, on said samples, by a number of bits defined from the current value of the counter, updating the counter, for the next clock stroke, by performing a modulo 2×P addition of the current value of the counter with the value P, P−1 or P+1 depending on whether the time error indication is respectively "nominal", "underrun" or "overrun".

In particular implementations, each FIFO is configured to activate an overflow risk indication when the number of samples stored in said FIFO is greater than or equal to a threshold, and writing to the FIFOs is authorized if and only if the overflow risk indication is not activated for any of the FIFOs.

In particular implementations, each FIFO is configured to activate a shortage risk indication when the number of samples stored in said FIFO is lower than or equal to a threshold, and reading from the FIFOs is authorized if and only if the shortage risk indication is not activated for any of the FIFOs.

In particular embodiments, the symbol frequency at the output of the synchronization device is greater than or equal to 100 Mbits/s.

BRIEF DESCRIPTION OF THE FIGURES

The invention will be better understood upon reading the following description, given by way of non-limiting example, and made by referring to FIGS. 1 to 8 which represent.

In these figures, identical references from one figure to another refer to identical or similar elements. For clarity, the represented elements are not necessarily to the same scale, unless stated otherwise.

DETAILED DESCRIPTION OF AN EMBODIMENT OF THE INVENTION

In the remainder of the description, the case of a space communications system will be considered.

Figure 1:
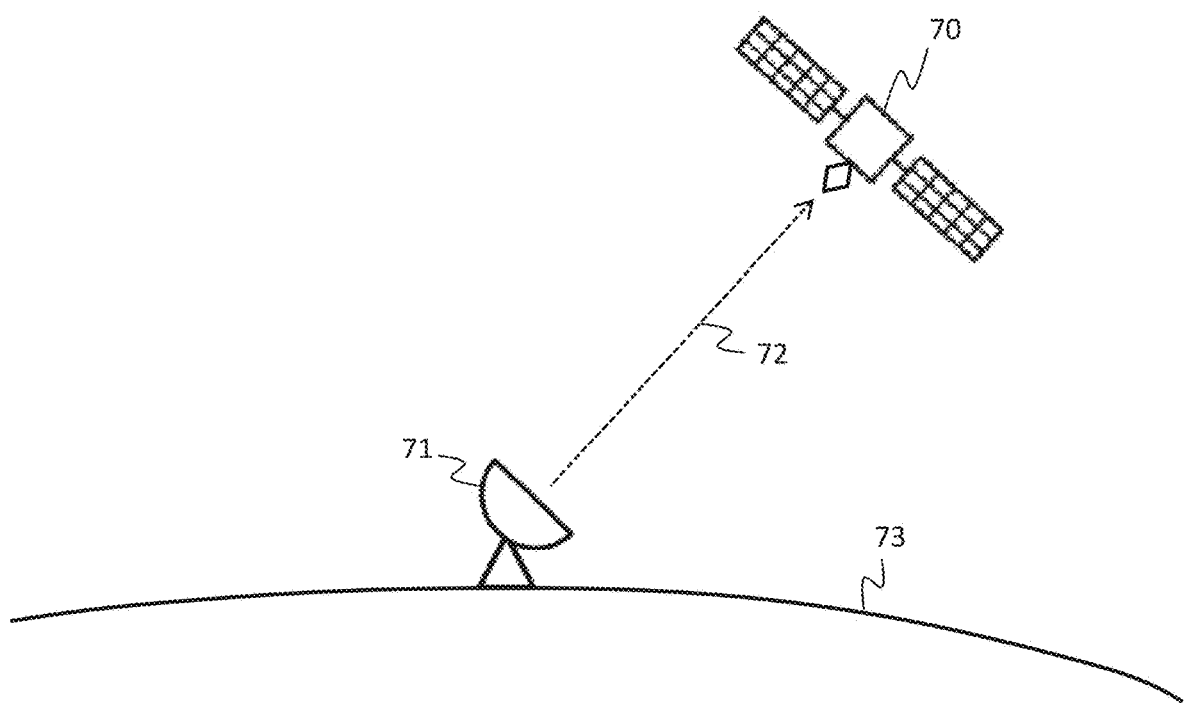
FIG. 1 a schematic representation of a space communications system between a satellite orbiting the Earth and a ground station, FIG. 2 a schematic representation of a symbol time synchronization device according to the invention FIG. 3 a schematic representation of an embodiment of a sample storage and reordering module, FIG. 4 a schematic representation of an embodiment of an interpolation module, FIG. 5 a schematic representation of an example of implementation of the control of new sample writing to the FIFOs of the sample storage and reordering module, FIG. 6 a schematic representation of an example of implementation of the control of sample reading from the FIFOs of the storage and reordering module, FIG. 7 a schematic representation of an example of implementation of the control of the permutation network of the sample storage and reordering module, FIG. 8 a schematic representation of the main steps of a method for operating a symbol time synchronization device according to the invention.

FIG. 1 schematically represents a space communications system between a satellite 70 orbiting the Earth 73 and a ground station 71. A signal 72 carrying data is transmitted by the ground station 71 to the satellite 70.

To transmit the signal 72, the ground station 71 includes a transmission chain. The transmission chain is clocked and generally includes a channel coder, an interleaver, a modulator and other conventional elements involved in signal transmission (filters, oscillators, amplifiers, digital/analog converters, etc.). After coding and interleaving, the data to be transmitted are modulated in the form of symbols. A symbol may correspond to one bit or a set of data bits. For example, a symbol may correspond to a particular phase, amplitude and/or frequency value of the signal, depending on the modulation used.

To receive the signal 72, the satellite 70 includes a reception chain. The reception chain is clocked by a clock and generally includes a sampler, a symbol time synchronization device, a demodulator, a deinterleaver, a channel decoder, and other conventional elements involved in signal reception (filters, oscillators, amplifiers, analog/digital converters, etc.). The role of the sampler is to take values from the signal 72 at regular intervals to produce a sequence of discrete values called samples. The role of the symbol time synchronization device is to detect and synchronize the symbols carried by the signal 72 from the samples thus obtained. Symbols are then transformed into binary data by the demodulator. Finally, the binary data are decoded.

The signal 72 can be a radio signal or an optical signal. The data rates targeted for the space communications under consideration are relatively high, for example greater than 100 Mbit/s, or even greater than 1 Gbit/s, or even greater than 10 Gbit/s.

Modulation can be of the PSK (Phase-Shift Keying) or NRZ-O3K (Non-Return-to-Zero Optical On-Off Keying) type.

In the example under consideration, the signal 72 is transmitted by the ground station 71 to the satellite 70. In another example, however, there is nothing to prevent the satellite 70 from transmitting a signal to the earth station 71. In this case, the satellite 70 would act as the transmitter device, with a transmission chain as described above, and the ground station 71 would act as the receiver device, with a reception chain as described above.

Nor would there be anything to prevent considering a transmitter device and a receiver device of another communications system, for example, a cellular land communications system.

To achieve high speeds, it becomes necessary to use a parallel architecture for the symbol time synchronization device in order to meet the real-time requirements of the FPGA or ASIC technologies used to design it.

Figure 2:
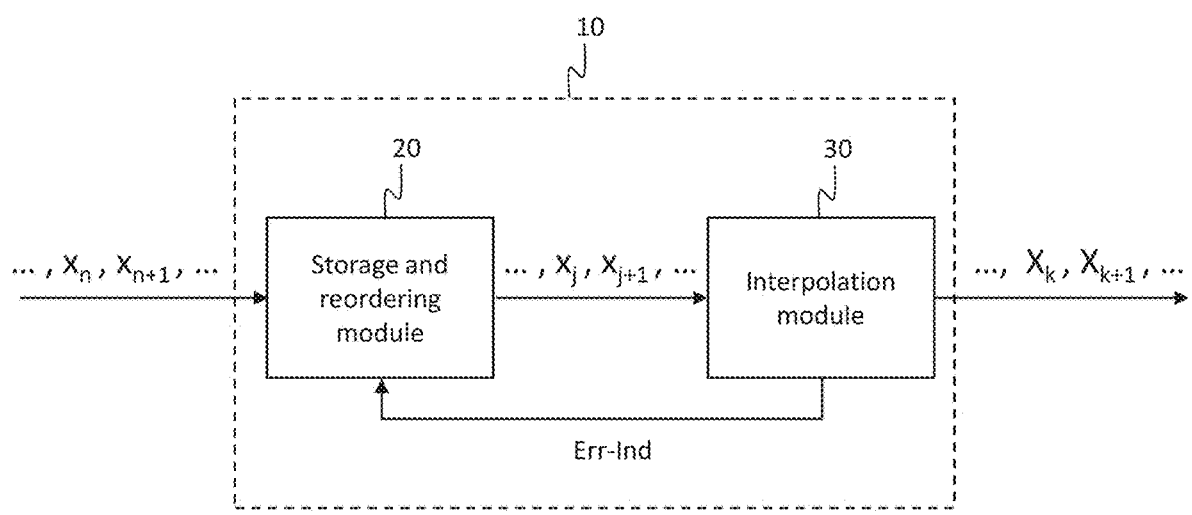

FIG. 2 schematically represents a symbol time synchronization device 10 according to the invention. As previously explained, the symbol time synchronization device 10 takes samples $x_n$ as an input and provides symbols $X_k$ as an output. The symbol time synchronization device 10 is clocked by a clock (not represented in the figures for the sake of simplicity).

As illustrated in FIG. 2, the symbol time synchronization device 10 includes a sample storage and reordering module 20 and an interpolation module 30.

The role of the interpolation module 30 is to process the samples $x_j$ coming from the sample storage and reordering module 20 to detect and synchronize the symbols $X_k$ to be supplied to the demodulator.

The interpolation module 30 is also configured to provide, at each clock stroke, a time error indication Err-Ind (or synchronization error) estimated from the samples $x_j$ coming from the storage and reordering module 20. The time error indication Err-Ind takes a value from "nominal", "underrun" or "overrun".

The time error may be due to a frequency bias between the clock of the transmitter device and that of the receiver device, or to the Doppler effect induced by a variation in the relative speed of the transmitter device with respect to the receiver device.

The "underrun" case corresponds to the situation where the sampling frequency of the receiver device is too fast in relation to the symbol frequency. The "overrun" case corresponds to the situation where the sampling frequency of the receiver device is too slow in relation to the symbol frequency. The "nominal" case corresponds to the situation where the sampling frequency of the receiver device is substantially synchronized with the symbol frequency. The value of the time error may vary over time, especially due to the Doppler effect.

To cancel the time error, certain samples have to be kept (in the "underrun" case) or deleted (in the "overrun" case) when the error has accumulated to some level. In a parallel architecture, it is then necessary to reorder the sequence of samples to be processed when an operation to keep or delete (or "skip") a sample occurs.

The sample storage and reordering module 20 is configured to reorder (or rearrange) the samples supplied by the sampler before making them available to the interpolation module 30. Reordering of samples is performed as a function of the time error indication Err-Ind. In other words, it is the sample storage and reordering module 20 that is responsible for keeping or deleting certain samples as a function of the time error observed, and for reordering the samples appropriately before making them available to the interpolation module 30.

Figure 3:
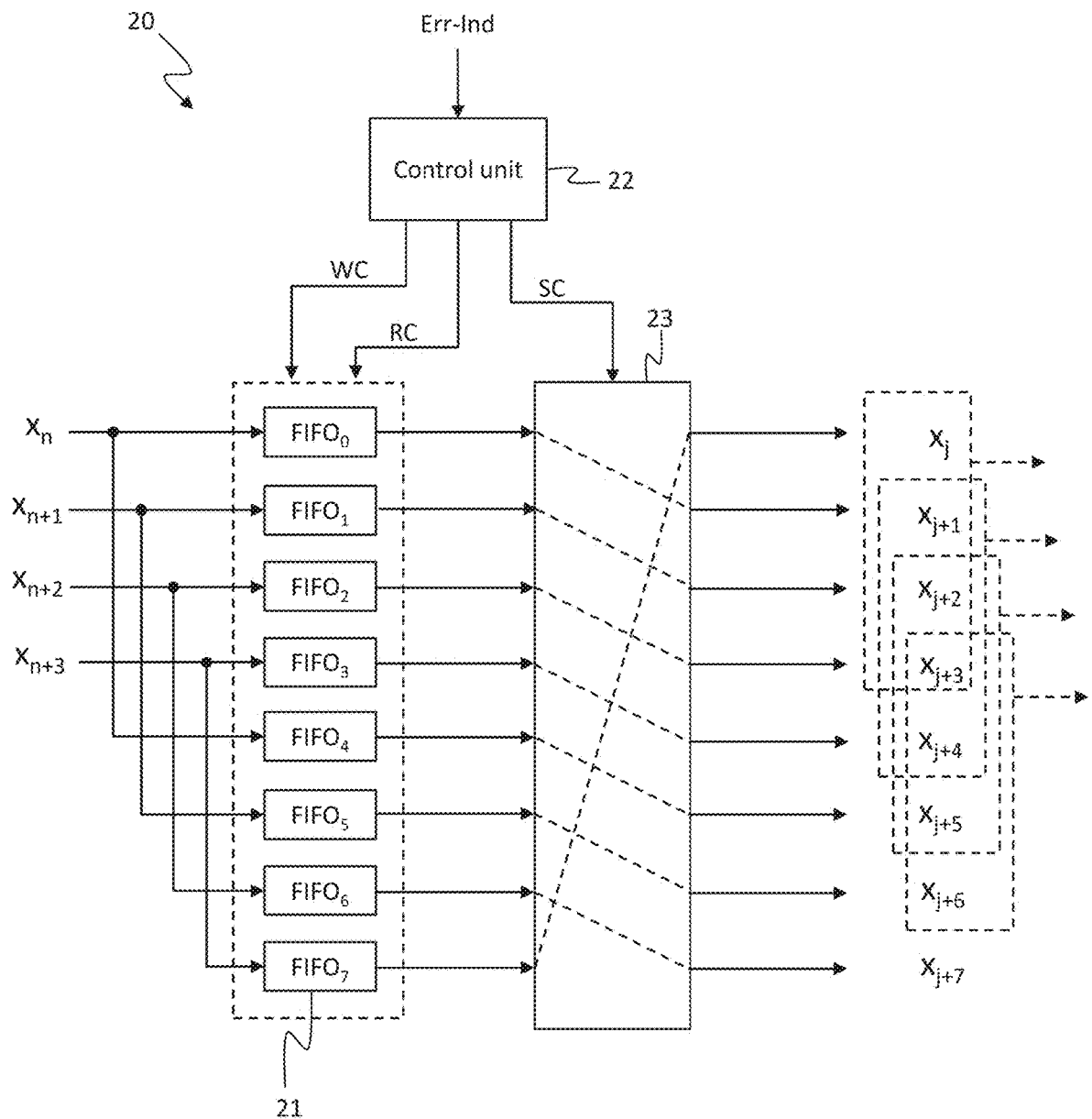

FIG. 3 schematically represents an embodiment of the sample storage and reordering module 20. This module 20 comprises a set of 2×P buffers 21 of the first-in first-out type or FIFOs. P corresponds to a parallelization factor. P is an even integer greater than or equal to four. Advantageously, the parallelization factor P can further be chosen to correspond to a power of two (to simplify certain parts of the implementation). In the example under consideration illustrated in FIG. 3, the parallelization factor is equal to four (P=4).

Each FIFO 21 can store several samples (for example eight samples per FIFO). In the example under consideration, a sample corresponds to a pair of values each sampled on I channel ("In-phase" channel) and Q channel ("Quadrature" channel) respectively. According to another example, a sample could correspond to only one of the I and Q channels, in which case it would be sufficient to duplicate the solution to process each of the I and Q channels. In the example under consideration, a sample is coded on eight bits with fixed-point quantization of Q(2.6) type. However, nothing would prevent a sample being encoded differently, for example on a different number of bits and/or with a different quantization method, such as floating point. The various ways of defining and encoding a sample are merely alternatives to the invention. The choice of an encoding or quantization method depends especially on the modulations and signal-to-noise ratios (SNRs) contemplated.

FIFOs 21 are cyclically ordered. By this it is meant, for example, that the FIFOs can each be identified by an index varying between 0 and (2×P−1), and that they are ordered according to their index in such a way that for an index i varying between 1 and (2×P−1), the FIFO with index (i−1) precedes the FIFO with index i and the FIFO with index (2×P−1) precedes the FIFO with index 0. In the example under consideration illustrated in FIG. 3, the FIFOs 21 are identified and ordered according to an index varying from 0 to 7 (in this case, the cyclic order of the FIFO indices is 0, 1, 2, 3, 4, 5, 6, 7, 0, 1, 2, . . . etc.).

It should be noted that nothing would prevent the FIFOs from being ordered differently. For example, it would be contemplatable to consider that the FIFOs are ordered as follows: first the even-index FIFOs, in ascending order, and then the odd-index FIFOs, in ascending order (in this case, the cyclic order of the FIFO indices is 0, 2, 4, 6, 1, 3, 5, 7, 0, 2, 4, . . . etc.).

At a current clock stroke, a sample is written to each of P successive FIFOs 21 that have not been used for writing at the previous clock stroke. In the example illustrated in FIG. 3, at the current clock stroke, four samples $x_n$, $x_{n+1}$, $x_{n+2}$, $x_{n+3}$ are written respectively to FIFOs with indexes 0 to 3 (sample $x_n$ is written to $FIFO_0$, sample $x_{n+1}$ is written to $FIFO_1$, sample $x_{n+2}$ is written to $FIFO_2$, sample $x_{n+3}$ is written to $FIFO_3$). At the next clock stroke, the four samples $x_{n+4}$, $x_{n+5}$, $x_{n+6}$, $x_{n+7}$ will be respectively written to the FIFOs with indices 4 to 7. And so on.

At the current clock stroke, a sample is read from each of P, (P−1), or (P+1) successive FIFOs 21, depending on whether the time error indication Err-Ind supplied by the interpolation module 30 for the clock stroke under consideration is "nominal", "underrun" or "overrun" respectively. In other words, P samples are read when the time error indication Err-Ind is "nominal", (P−1) samples are read when the time error indication Err-Ind is "underrun", and (P+1) samples are read when the time error indication Err-Ind is "overrun". The FIFOs 21 from which a sample is to be read are defined as a function of the FIFOs 21 from which samples have been read at the previous clock stroke (samples are read from the FIFOs that follow the FIFOs from which samples have been read at the previous clock stroke).

Conventionally, a FIFO 21 corresponds to a memory area associated with a write pointer and a read pointer. The write pointer indicates the address of the memory area at which the next sample is to be stored. The read pointer indicates an address of the memory area at which the oldest sample not yet read is stored (next sample to be read). The write pointer (respectively the read pointer) is incremented on each sample write operation (respectively on each sample read operation). It should be noted that there are different ways of managing a FIFO (a pointer that scrolls through the memory circularly, a binary pointer with Gray code that counts read or write actions, etc.). The choice of a particular method for managing reading or writing in a FIFO is only one alternative to the invention.

Each FIFO 21 can be configured to activate an overflow risk indication when the number of samples stored in the FIFO 21 is greater than or equal to a threshold (the number of samples stored in a FIFO 21 corresponds to the number of samples that have been written to said FIFO 21 and have not yet been read). Similarly, each FIFO 21 can be configured to activate a shortage risk indication when the number of samples stored in the FIFO 21 is less than or equal to a threshold. Write and/or read operations in the FIFOs 21 can then be controlled according to these overflow risk and/or shortage risk indications. These aspects will be described later with reference to FIGS. 5 and 6.

For each FIFO 21, the next sample to be supplied to the interpolation module 30 corresponds to the sample indicated by the read pointer of said FIFO 21. The sample storage and reordering module 20 comprises a permutation network 23 configured to reorder these samples to be supplied to the interpolation module 30.

The permutation network 23 corresponds, for example, to a computation unit capable of performing binary rotation operations (a "barrel shifter"). A binary rotation is similar to a logical shift (shift of bits by one or more places to the right or left), except that each outgoing bit is re-injected into the place freed by the shift.

At the current clock stroke, the permutation to be performed is defined as a function of a counter whose current value is defined as a function of the value of said counter at the previous clock stroke and as a function of the time error indication Err-Ind supplied by the interpolation module 30 at the previous clock stroke. The permutation to be performed depends on the history of sample keeping and/or deletion operations successively performed at the previous clock strokes. Updating the counter at each clock stroke as a function of the time error indication Err-Ind makes it possible to identify the FIFO 21 from which the next samples are to be supplied to the interpolation module 30.

Figure 5:
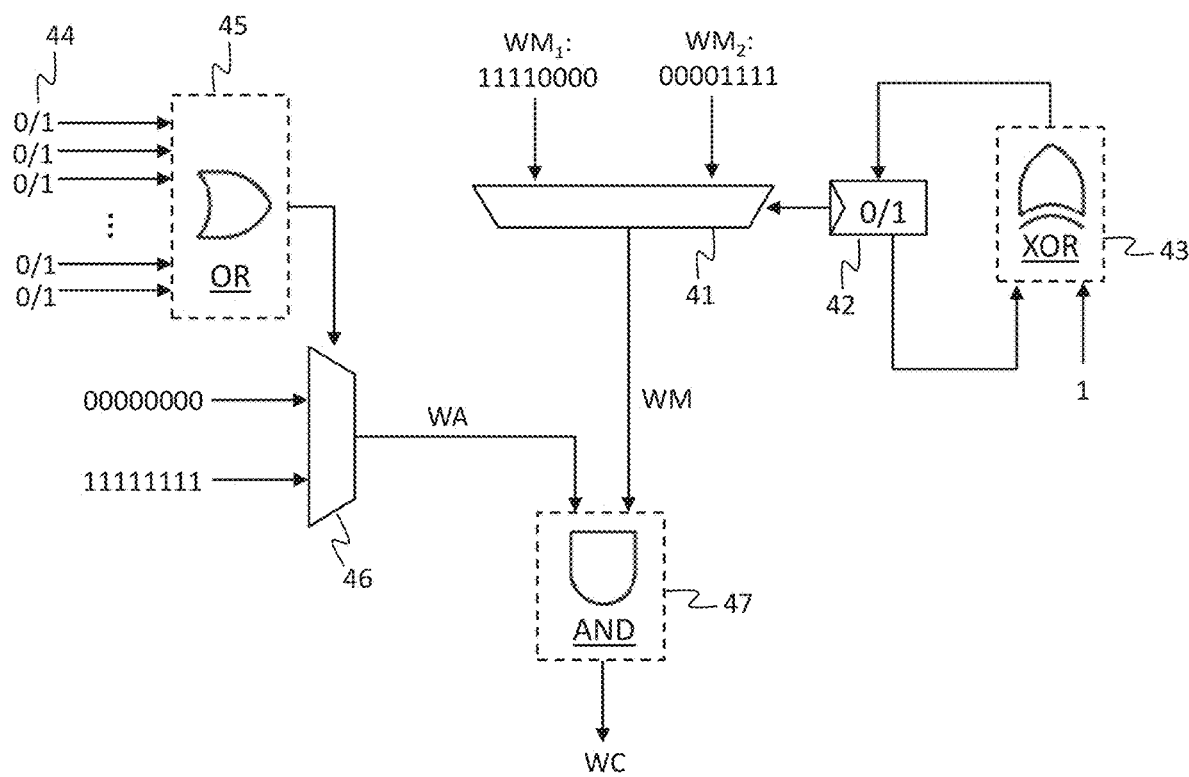
Figure 6:
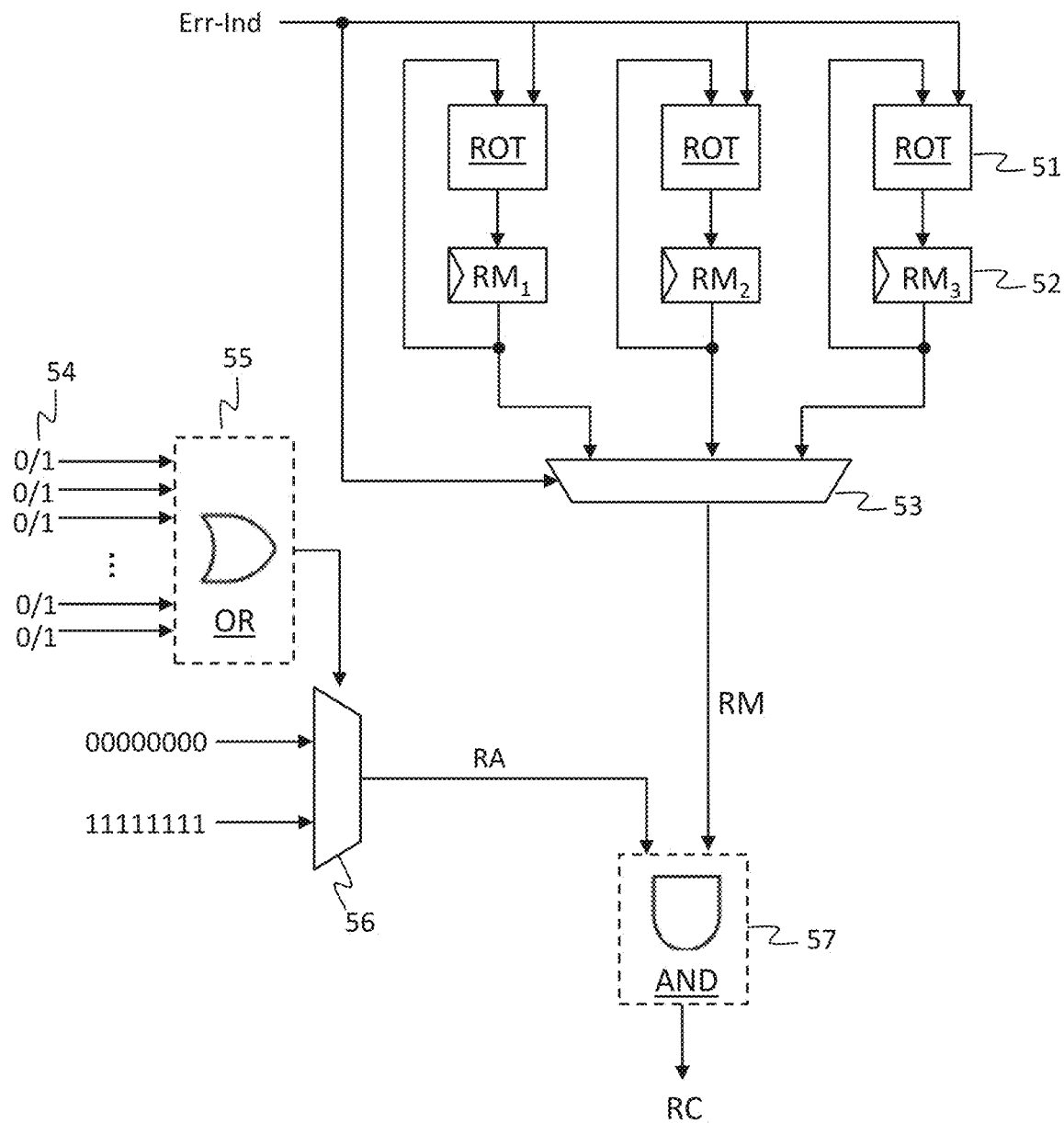
Figure 7:
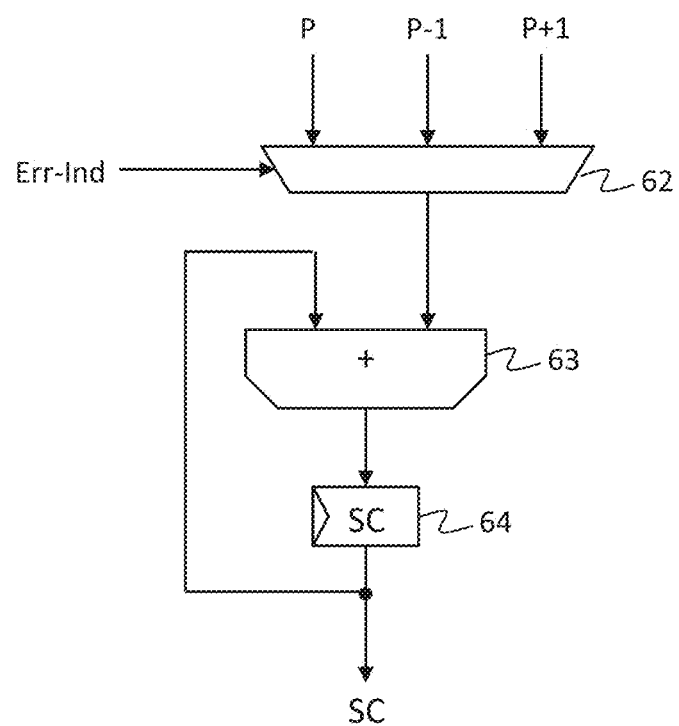

The sample storage and reordering module 20 comprises a control unit 22 configured to perform the read and write operations in the FIFOs 21 and the sample reordering operations with the permutation network 23. The control unit 22 is especially configured to control the FIFOs to which a sample is to be written, to control the FIFOs from which a sample is to be read, and to control the permutation network 23. In the example of FIG. 3, write control is represented by the indication WC ("Write Control") which indicates to which FIFOs 21 a sample is to be written, read control is represented by the indication RC ("Read Control") which indicates from which FIFOs 21 a sample is to be read, and permutation network control 23 is represented by the indication SC ("Shift Control") which indicates in which order the available samples is to be supplied to the interpolation module 30. FIGS. 5 to 7, which will be described in detail later, illustrate particular implementations for writing, reading and reordering samples.

Figure 4:
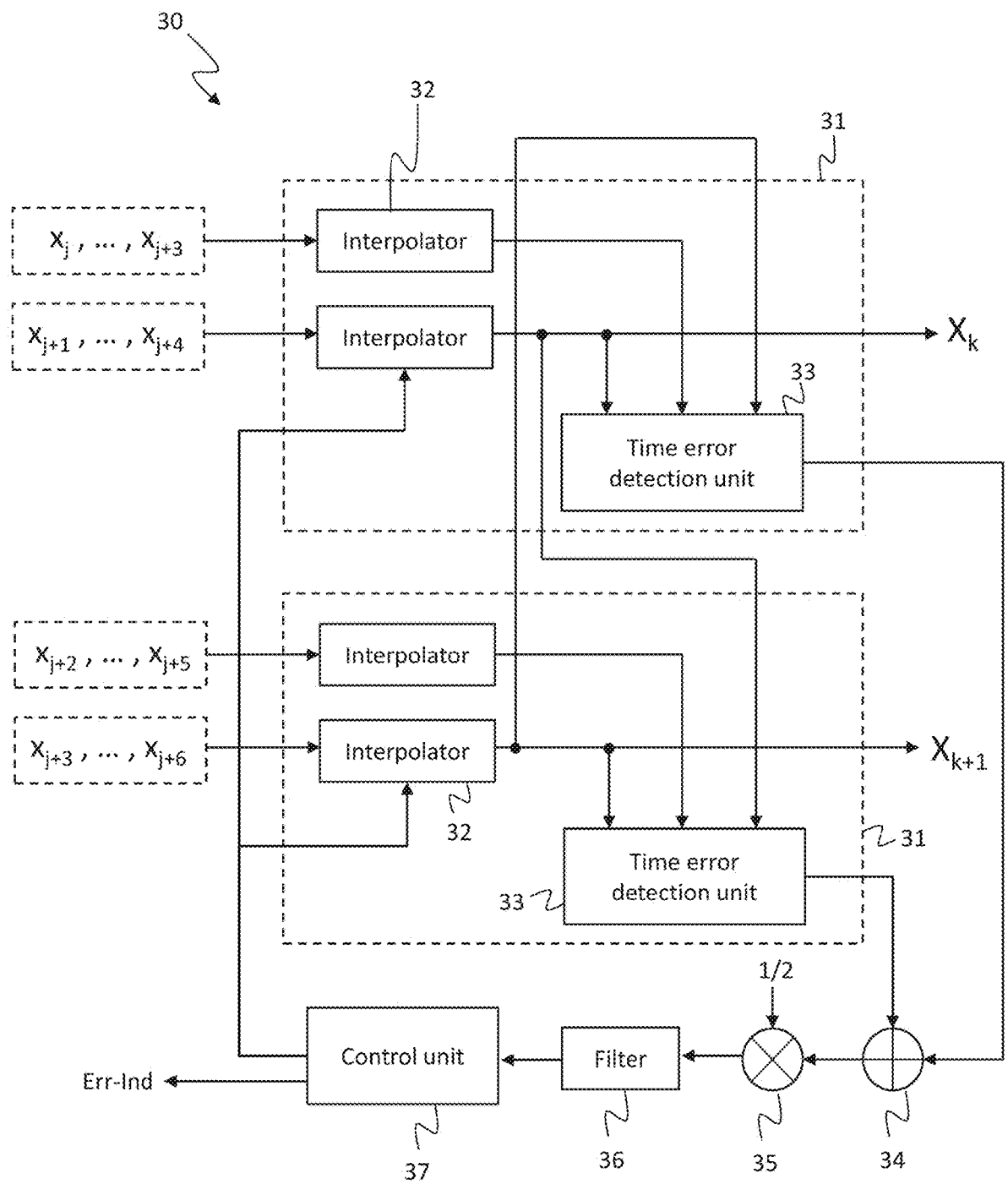

FIG. 4 schematically represents an embodiment of the interpolation module 30. In the example under consideration, Gardner algorithm is used (in its version for a parallel architecture). The interpolation module 30 comprises two parallel interpolation blocks 31. Similar to what is described in document "A Parallel Timing Synchronization Structure in Real-Time High Transmission Capacity Wireless Communication Systems", Xin Hao et al. each block 31 comprises two interpolators 32 and a time error detection unit 33. The time error detection unit 33 is fed by the two interpolators 32 of the block 31 to which it belongs, as well as by one of the two interpolators 32 of the other block 31.

At one clock stroke, each interpolator 32 takes as an input four samples from the samples made available by the sample storage and reordering module 20: the first interpolator 32 of the first block 31 takes as an input the samples $x_j$, $x_{j+1}$, $x_{j+2}$, $x_{j+3}$; the second interpolator 32 of the first block 31 takes as an input the samples $x_{j+1}$, $x_{j+2}$, $x_{j+3}$, $x_{j+4}$; the first interpolator 32 of the second block 31 takes as an input the samples $x_{j+2}$, $x_{j+3}$, $x_{j+4}$, $x_{j+5}$; the second interpolator 32 of the second block 31 takes as an input the samples $x_{j+3}$, $x_{j+4}$, $x_{j+5}$, $x_{j+6}$. Each block 31 supplies a symbol as an output: the first block 31 supplies the symbol $X_k$; the second block 31 supplies the symbol $X_{k+1}$.

Thus, at each clock stroke, four new samples ($x_n$, $x_{n+1}$, $x_{n+2}$, $x_{n+3}$) supplied by the sampler are processed by the storage and reordering module 20, and two new symbols ($X_k$, $X_{k+1}$) are supplied by the interpolation module 30. Generally speaking, the use of a parallelization factor of value P enables the symbol time synchronization device 10, at each clock stroke, to process P new samples as an input and supply P/2 new symbols as an output. At each clock stroke, P+3 samples are processed by the interpolation module 30.

The interpolation module 30 includes a control unit 37 configured to estimate, conventionally (Gardner algorithm), a time error from the time errors detected individually by each of the blocks 31. The control unit 37 can especially rely on computation units of the adder 34, multiplier/divider 35 and loop filter 36 type to estimate the time error. The control unit 37 is also configured to supply the time error indication Err-Ind to the storage and reordering module 20 as a function of the time error estimated.

FIG. 5 schematically represents a particular implementation of write control in the FIFOs of P new samples.

In this particular implementation, writing to the FIFOs is controlled by a Write Mask WM including 2×P bits. Each bit of the write mask is respectively associated with a FIFO 21 and indicates whether or not said FIFO 21 is to be used for writing. The write mask WM can take two distinct possible values $WM_1$ and $WM_2$, each having exactly P bits indicating that the associated FIFOs are to be used for writing (these are successive FIFOs, that is, they follow each other in the cyclic order of the FIFOs). Values $WM_1$ and $WM_2$ have no bit in common.

In the example under consideration illustrated in FIG. 5, the parallelization factor P is equal to four (P=4). The write mask WM therefore includes eight bits (2×P=8). A bit set to '1' indicates that the associated FIFO is to be used for writing. A bit set to '0' indicates that the associated FIFO should not be used for writing. Bits are ordered from left to right, and the index of a bit corresponds to the index of the FIFO with which it is associated. The mask $WM_1$, whose binary value is 0b11110000, indicates that only the four FIFOs with indexes 0 to 3 are to be used for writing. The mask $WM_2$, whose binary value is 0b00001111, indicates that only the four FIFOs with indexes 4 to 7 are to be used for writing.

It should be noted that nothing would prevent the use of different values for $WM_1$ and $WM_2$. For example, if the FIFOs are ordered by first considering even-index FIFOs and then odd-index FIFOs, then the mask $WM_1$ can take the binary value 0b10101010 and the mask $WM_2$ can take the binary value 0b01010101. It should also be noted that it is not essential for the index of a bit in a write mask to correspond to the index of the FIFO with which it is associated: it would be possible, for example, to consider that the first four bits of the write mask correspond to the four even-index FIFOs, then that the next four bits of the write mask correspond to the four odd-index FIFOs. Nor would there be anything to prevent the use of inverted logic, where a bit set to '0' indicates that the associated FIFO is to be used for writing, and a bit set to '1' indicates that the associated FIFO should not be used for writing.

The control unit 22 is configured to change the value of the write mask WM at each clock stroke. In the example under consideration illustrated in FIG. 5, the choice of the value to be used for the write mask WM from $WM_1$ and $WM_2$ is made by a multiplexer 41 controlled by a binary value 42 updated at each clock stroke by means of a gate 43 configured to perform an "OR exclusive" (XOR) logical operation between said binary value 42 and the value '1'. However, other implementations could be contemplated, for example using a register storing the value of the write mask WM and on which an operation of complement on one (inversion of all bits) is performed at each clock stroke.

The table below gives an example of values taken by the write mask WM at successive clock strokes. In the table below, notation $CK_p$ represents a clock stroke of index p.

TABLE 1

| CK | WM |
|---|---|
| ... | ... |
| $CK_{p-1}$ | 0b11110000 |
| $CK_p$ | 0b00001111 |
| $CK_{p+1}$ | 0b11110000 |
| $CK_{p+2}$ | 0b00001111 |
| ... | ... |

As indicated previously, each FIFO 21 can be configured to activate an overflow risk indication 44 when the number of samples stored in the FIFO 21 is greater than or equal to a threshold. In the example under consideration, each FIFO can include up to eight samples, the overflow risk indication 44 takes the value '1' when there are at least six samples present in the FIFO, otherwise the overflow risk indication 44 takes the value '0'. The gate 45 is configured to perform an "OR" logical operation between the overflow risk indications 44 of the various FIFOs 21. The "OR" gate 45 controls a multiplexer 46 to define the value of a Write Authorization WA binary mask. The WA mask takes the value 0b00000000 when an overflow risk indication 44 is set to '1' for at least one of the FIFOs (that is, when the result of the "OR" gate 45 is '1'). The WA mask takes the value 0bi1111111 when the overflow risk indication 44 is set to '0' for all the FIFOs (that is, when the result of the "OR" gate 45 is '0'). The gate 47 is configured to perform a logical "AND" operation between the WM mask and the WA mask. The "AND" gate 47 supplies as an output the WC binary mask which controls the FIFOs to which a sample is to be written. Thus, writing to the FIFOs 21 is authorized if and only if the overflow risk indication 44 is not activated for any of the FIFOs 21.

It should be noted that, in the description of FIG. 5 hereinbefore, it is assumed that there are P valid samples at the clock stroke under consideration. However, this is not always necessarily the case. For example, if the clock clocking the symbol time synchronization device 10 is faster than the clock of the analog/digital converter, new samples may not be available at certain clock strokes. It is then contemplatable to take account of an additional indication which provides information on the validity of the samples at the clock stroke under consideration (for the sake of simplicity, this indication of sample validity is not represented in the figures). In such a case, writing to the FIFOs 21 as well as updating the WM write mask would be conditioned by this indication of sample validity.

FIG. 6 schematically represents a particular implementation of read control in the FIFOs of P, (P−1) or (P+1) samples as a function of the indication Err-Ind.

In this particular implementation, reading from the FIFOs 21 is controlled by a Read Mask RM including 2×P bits. This read mask RM corresponds to one of the read masks $RM_1$, $RM_2$ and $RM_3$. The choice of the read mask to be used is made via a multiplexer 53 controlled by the time error indication Err-Ind. For example, the read mask $RM_1$ is used when the time error indication Err-Ind is "nominal", the read mask $RM_2$ is used when the time error indication Err-Ind is "underrun" and the read mask $RM_3$ is used when the indication Err-Ind is "overrun".

Each bit of a read mask is respectively associated with a FIFO 21 and indicates whether or not said FIFO 21 is to be used for reading. As for the FIFOs 21, the bits of the read masks are cyclically ordered: for an index i varying between 1 and (2×P−1), the bit of index (i−1) precedes the bit of index i and the bit of index (2×P−1) precedes the bit of index 0.

In the example under consideration illustrated in FIG. 6, the parallelization factor P is equal to four (P=4) and the read masks each include eight bits. A bit set to '1' indicates that the associated FIFO is to be used for reading, a bit set to '0' indicates that the associated FIFO should not be used for reading (again, nothing would prevent the use of inverse logic). Bits are ordered from left to right, and the index of a bit corresponds to the index of the FIFO with which it is associated.

The read mask $RM_1$ associated with the "nominal" indication includes exactly P successive bits set to '1'. The read mask $RM_2$ associated with the "underrun" indication includes exactly (P−1) successive bits set to '1'. The read mask $RM_3$ associated with the "overrun" indication includes exactly (P+1) successive bits set to '1'. For example, the read mask $RM_1$ is initialized to the binary value 0b11110000 (to indicate that only the four FIFOs of index 0 to 3 are to be used for reading); the read mask $RM_2$ is initialized to the binary value 0b11100000 (to indicate that only the three FIFOs of indices 0 to 2 are to be used for reading); the read mask $RM_3$ is initialized to the binary value 0b11111000 (to indicate that only the five FIFOs of indices 0 to 4 are to be used for reading).

At a current clock stroke, the control unit 22 is configured to update each of the three read masks $RM_1$, $RM_2$ and $RM_3$, for the next clock stroke, by performing a binary rotation of the current value of said read masks respectively by P, (P−1) or (P+1) bits depending on whether the time error indication Err-Ind supplied by the interpolation module 30 is respectively "nominal", "underrun" or "overrun". In other words, if the indication is "nominal", each of the three read masks $RM_1$, $RM_2$ and $RM_3$ is rotated by P bits; if the indication is "underrun", each of the three read masks $RM_1$, $RM_2$ and $RM_3$ is rotated by (P−1) bits; if the indication is "overrun", each of the three read masks $RM_1$, $RM_2$ and $RM_3$ is rotated by (P+1) bits. Thus, the FIFOs 21 from which a sample is to be read at the current clock stroke are the FIFOs 21 that follow the FIFOs 21 from which samples have been read at the previous clock stroke: if the index of the last FIFO that has been used from reading at the previous clock stroke takes a value i between 0 and (2×P−2), then the first FIFO to be used for reading on the current clock stroke is index (i+1); if the index of the last FIFO that has been used from reading at the previous clock stroke has a value (2×P−1), then the first FIFO to be used for reading at the current clock stroke is index 0.

In FIG. 6, the "ROT" blocks 51 each represent an electronic circuit able to perform a binary rotation operation. In the example under consideration, it is a rotation to the right (since the bit of index 0 corresponding to the first FIFO is the leftmost bit, that is the bit with the highest weight) but it is obvious that a rotation to the left could also be used if the bits were ordered in the other direction.

The table below gives an example of values taken by the read masks at successive clock strokes. In the table below, notation $CK_p$ represents a clock stroke of index p; notation RM corresponds to the read mask used for the current clock stroke; notation "Next $RM_i$" corresponds to the value of the read mask $RM_i$ updated for the next clock stroke (with i=1, 2 or 3).

TABLE 2

| CK | Err-Ind | RM | Next RM$_1$ | Next RM$_2$ | Next RM$_3$ |
|---|---|---|---|---|---|
| ... | ... | ... | 0b11110000 | 0b11100000 | 0b11111000 |
| CK$_{p-1}$ | Normal | 0b11110000 | 0b00001111 | 0b00001110 | 0b10001111 |
| CK$_p$ | Normal | 0b00001111 | 0b11110000 | 0b11100000 | 0b11110000 |
| CK$_{p+1}$ | Overrun | 0b11111000 | 0b10000111 | 0b00000111 | 0b11000111 |
| CK$_{p+2}$ | Normal | 0b10000111 | 0b01111000 | 0b01110000 | 0b01111100 |
| ... | ... | ... | ... | ... | ... |

As indicated previously, each FIFO 21 can be configured to activate a shortage risk indication 54 when the number of samples stored in the FIFO 21 is lower than or equal to a threshold. In the example under consideration, each FIFO can include up to eight samples, the shortage risk indication 54 takes the value '1' when the number of samples in the FIFO 21 is lower than or equal to two, otherwise the shortage risk indication 54 takes the value '0'. The gate 55 is configured to perform a logical "OR" operation between the shortage risk indications 54 of the various FIFOs 21. The "OR" gate 55 controls the multiplexer 56 to define the value of a Read Authorization RA binary mask. The RA mask takes the value 0b00000000 when a shortage risk indication 54 is set to '1' for at least one of the FIFOs (that is, when the result of the "OR" gate 55 is '1'). The RA mask takes the value 0b1111111 when a shortage risk indication 54 is set to '0' for all the FIFOs (that is, when the result of the "OR" gate 55 is '0'). The gate 57 is configured to perform a logical "AND" operation between the RM mask and the RA mask. The "AND" gate 57 supplies as an output the RC binary mask controlling the FIFOs from which a sample is to be read. Thus, reading from the FIFOs 21 is authorized if and only if the shortage risk indication 54 is not activated for any of the FIFOs 21.

Alternatively, or additionally, a mechanism can be implemented to prohibit reading from the FIFOs 21 during a predetermined number of clock strokes after a reset of the synchronization device 10, in order to allow time for the FIFOs 21 to fill up.

When the read control in the FIFOs uses rotation operations on binary read masks, as described above with reference to FIG. 6, the bits are ordered from left to right (or from right to left) in the same cyclic order as the FIFOs with which they are respectively associated. However, it should be noted that it is not necessary for the index of a bit of a read mask to correspond to the index of the FIFO with which it is associated.

As described previously with reference to FIG. 5, it is contemplatable to use an additional indication of the sample validity at the clock stroke under consideration. In such a case, reading from the FIFOs 21 as well as updating the read masks RM$_1$, RM$_2$ and RM$_3$ would be conditioned by this indication of sample validity.

FIG. 7 schematically represents a particular implementation of control of the permutation network 23. In the example under consideration, the permutation network 23 is an electronic circuit able to perform binary rotation operations. At the current clock stroke, the rotation to be performed is defined as a function of the SC "Shift Control") indication. More particularly, the SC indication makes it possible to define the number of bits to be shifted according to the rotation operation.

The SC indication corresponds to a counter 64 whose current value is defined as a function of the value of said counter 64 at the previous clock stroke and as a function of the time error indication Err-ind supplied by the interpolation module 30 to the previous clock stroke. Updating the counter 64 at each clock stroke as a function of the time error indication Err-Ind makes it possible to identify the FIFO 21 from which the next samples are to be supplied to the interpolation module 30.

The number of bits with which the value of counter 64 is coded is equal to the ceiling (that is, to the nearest higher integer) of the binary logarithm of 2×P (that is, $\lceil \log_2(2 \times P) \rceil$), that is, three bits in the example under consideration (P=4 and $\lceil \log_2(8) \rceil = 3$).

At the current clock stroke, the control unit 22 is configured to update the counter 64, for the next clock stroke, by performing a modulo 2×P addition of the current value of the counter 64 with the value P, P−1 or P+1 depending on whether the time error indication Err-Ind supplied by the interpolation module 30 is respectively "nominal", "underrun" or "overrun". The choice of the value to be used as a function of the time error indication Err-Ind is implemented by the multiplexer 62. The modulo 2×P addition is implemented par the adder 63 (it is a 2×P bit adder). It may be noted that choosing the value P as a power of two simplifies the hardware implementation of the adder 63 (an N-bit adder directly gives a sum modulo $2^N$).

As indicated previously, at a clock stroke, each interpolator 32 takes as an input four samples made available by the storage and reordering module 20. In the example under consideration, there are four interpolators 32 (P=4); seven samples are made available to the four interpolators 32 (P+3=7). Each of these seven samples corresponds to the first sample available in a FIFO 21 (that is, to the sample indicated by the read pointer of this FIFO, or in other words to the sample that will be read the next time this FIFO is read). The SC value of the counter 64 indicates the order in which these samples are to be made available to the interpolation module 30 (the counter 64 indicates the index of the FIFO 21 from which the next samples are to be made available to the interpolation module 30). In other words, if the concatenation of the binary values of the samples available at a current clock stroke is considered, the reordering of the samples to be supplied to interpolation module 30 amounts to performing a binary rotation by a number of bits equal to the SC value of the counter 64 multiplied by the bit size of a sample.

The table below gives an example of the SC values taken by the counter 64 at successive clock strokes, and the FIFOs to be used to make samples available to the interpolation module 30. In the table below, notation CK$_p$ represents a clock stroke of index p; notation SC corresponds to the SC value of the counter 64 for the current clock stroke; notation "Next SC" corresponds to the SC value of the counter 64 after updating for the next clock stroke.

TABLE 3

| CK | Err-Ind | SC | Next SC | FIFOs used to make samples available to the interpolation module |
|---|---|---|---|---|
| ... | ... | ... | 0 | ... |
| CK$_{p-1}$ | Normal | 0 | 4 | FIFO$_0$ to FIFO$_6$ |
| CK$_p$ | Normal | 4 | 0 | FIFO$_4$ to FIFO$_7$ and then FIFO$_0$ to FIFO$_2$ |
| CK$_{p+1}$ | Overrun | 0 | 5 | FIFO$_0$ to FIFO$_6$ |
| CK$_{p+2}$ | Normal | 5 | 1 | FIFO$_5$ to FIFO$_7$ and then FIFO$_0$ to FIFO$_3$ |
| CK$_{p+3}$ | Normal | 1 | 5 | FIFO$_1$ to FIFO$_7$ |
| CK$_{p+4}$ | Underrun | 5 | 0 | FIFO$_5$ to FIFO$_7$ and then FIFO$_0$ to FIFO$_3$ |

TABLE 3-continued

| CK | Err-Ind | SC | Next SC | FIFOs used to make samples available to the interpolation module |
|---|---|---|---|---|
| $CK_{p+5}$ | Underrun | 0 | 3 | $FIFO_0$ to $FIFO_6$ |
| ... | ... | 3 | ... | $FIFO_3$ to $FIFO_7$ and then $FIFO_0$ to $FIF_0$ |

If the FIFOs have not been read at the current clock stroke, for example due to a shortage risk following a reset, or if the samples are not valid, then the counter 64 is not updated and the sample reordering step is not performed.

Figure 8:
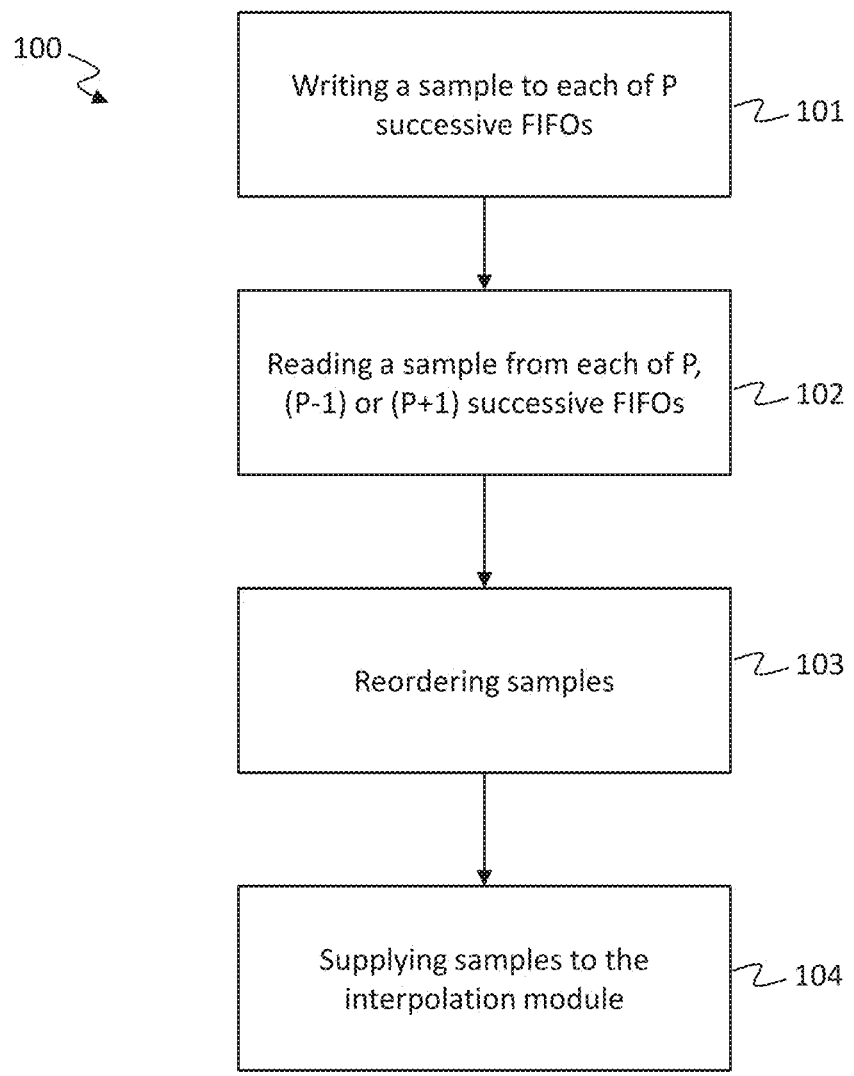

FIG. 8 schematically represents the main steps of a method 100 for operating a symbol time synchronization device according to the invention, in particular a symbol time synchronization device 10 such as described hereinbefore with reference to FIGS. 2 to 7. At a current clock stroke, and in a nominal case (that is, when the samples as an input are valid and there is no shortage or overflow risk indication in the FIFOs), the method 100 includes the following steps of:
- writing 101 a sample to each of P successive FIFOs 21 which have not been used for writing at the previous clock stroke,
- reading 102 a sample from each of P, P−1, or P+1 successive FIFOs 21 depending on whether the time error indication Err-Ind supplied by the interpolation module 30 is respectively "nominal", "underrun" or "overrun"; the FIFOs 21 from which a sample is to be read being defined as a function of the FIFOs 21 from which samples have been read at the previous clock stroke,
- reordering 103 the samples to be supplied to the interpolation module 30 as a function of a counter 64 whose current value is defined as a function of the value of the counter 64 at the previous clock stroke and as a function of the time error indication Err-Ind supplied by the interpolation module 30 at the previous clock stroke,
- supplying 104 the reordered samples to the interpolation module 30.

The solutions set out in the description hereinbefore make it possible to implement, in a relatively simple and particularly efficient way, a symbol time synchronization device with parallel architecture 10 capable of supporting very high speeds.

The particular embodiments especially described with reference to FIGS. 5 to 7 are particularly advantageous, since they enable the samples to be supplied to the interpolation module 30 to be dynamically rearranged using binary rotation operations that are relatively inexpensive in terms of hardware implementation and computation time. However, it should be noted that these particular embodiments have been described as non-limiting examples, and that other alternatives are consequently contemplatable.

The invention has been described considering optical or radio space communications systems with speeds greater than 100 Mbits/s. However, other communications systems, including land communications, for example cellular communications, may also be considered.

The invention claimed is:

1. A symbol time synchronization device with parallel architecture, configured to be clocked by a clock, and comprising:
   a sample storage and reordering module comprising a control unit and 2×P buffers of the first-in-first-out type, or FIFOs, P being an even integer greater than or equal to four, each FIFO being able to store several samples, the FIFOs being ordered cyclically,
   an interpolation module configured to supply, at each clock stroke, a time error indication determined from samples coming from the storage and reordering module, said time error indication taking one value from "nominal", "underrun" or "overrun",
   at a current clock stroke, the control unit is configured to:
      write a sample to each of the P successive FIFOs that have not been used for writing at the previous clock stroke,
      read a sample from each of P, P−1, or P+1 successive FIFOs depending on whether the time error indication is "nominal", "underrun" or "overrun" respectively, the FIFOs from which a sample is to be read being defined as a function of the FIFOs from which samples have been read at the previous clock stroke,
      reorder samples to be supplied to the interpolation module by means of a permutation network and as a function of a counter whose current value is defined as a function of the value of said counter at the previous clock stroke and as a function of the time error indication supplied by the interpolation module at the previous clock stroke.

2. The synchronization device according to claim 1, wherein writing to the FIFOs is controlled by a binary write mask including 2×P bits, each bit being respectively associated with a FIFO and indicating whether or not said FIFO is to be used for writing, wherein the write mask can take two distinct possible values each having exactly P bits indicating that the associated FIFOs are to be used for writing, said values having no bits in common, and the control unit is configured to change the value of the write mask at each clock stroke.

3. The synchronization device according to claim 1, wherein reading from the FIFOs is controlled by three binary read masks each including 2×P cyclically ordered bits, each bit being respectively associated with a FIFO and indicating whether or not said FIFO is to be used for reading, each read mask being respectively associated with one of the three possible values of the time error indication, each read mask including exactly P, P−1 or P+1 successive bits indicating that the associated FIFOs are to be used for reading, depending on whether the read mask is respectively associated with the indication "nominal", "underrun" or "overrun", and the control unit is configured, for said current clock stroke, to:
   identify the read mask to be used as a function of the time error indication,
   update each read mask, for the next clock stroke, by performing a binary rotation of the current value of said read mask by P, P−1 or P+1 bits depending on whether the time error indication is respectively "nominal", "underrun" or "overrun".

4. The synchronization device according to claim 1, wherein, to reorder the samples to be supplied to the interpolation module, the control unit is configured to:
   control the permutation network to perform a binary rotation on said samples by a number of bits defined from the current value of the counter,
   update the counter, for the next clock stroke, by performing a modulo 2×P addition of the current value of the counter with the value P, P−1 or P+1 depending on whether the time error indication is respectively "nominal", "underrun" or "overrun".

5. A receiver device of a communications system, wherein said receiver device includes a synchronization device according to claim 1.

6. A satellite including a receiver device according to claim 5.

7. The satellite according to claim 6, wherein the communications system is a space communications system providing a data rate at least equal to 100 Mbit/s.

8. A method for operating a symbol time synchronization device with parallel architecture, said synchronization device being clocked by a clock and comprising:
- a sample storage and reordering module comprising 2×P buffers of the "first-in, first-out" type or FIFOs, P being an even integer greater than or equal to four, each FIFO being able to store several samples, the FIFOs being ordered cyclically,
- an interpolation module configured to supply, at each clock stroke, a time error indication determined from samples coming from the storage and reordering module, said time error indication taking one value from "nominal", "underrun" or "overrun", said method includes, at a current clock stroke:
- writing a sample to each of the P successive FIFOs that have not been used for writing at the previous clock stroke,
- reading a sample from each of P, P−1, or P+1 successive FIFOs depending on whether the time error indication is "nominal", "underrun" or "overrun" respectively, the FIFOs from which a sample is to be read being defined as a function of the FIFOs from which samples have been read at the previous clock stroke,
- reordering samples to be supplied to the interpolation module as a function of a counter whose current value is defined as a function of the value of the counter at the previous clock stroke and as a function of the time error indication supplied by the interpolation module at the previous clock stroke,
- supplying the reordered samples to the interpolation module.

9. The method according to claim 8, wherein writing to the FIFOs is controlled by a binary write mask including 2×P bits, each bit being respectively associated with a FIFO and indicating whether or not said FIFO is to be used for writing, wherein the write mask can take two distinct possible values each having exactly P bits indicating that the associated FIFOs are to be used for writing, said values having no bits in common, and the value of the write mask is changed at each clock stroke.

10. The method according to claim 8, wherein reading from the FIFOs is controlled by three binary read masks each including 2×P cyclically-ordered bits, each bit being respectively associated with a FIFO and indicating whether or not said FIFO is to be used for reading, each read mask being respectively associated with one of the three possible values of the time error indication, each read mask including exactly P, P−1 or P+1 successive bits indicating that the associated FIFOs are to be used for reading depending on whether the read mask is respectively associated with the indication "nominal", "underrun" or "overrun", and reading includes:
- identifying the read mask to be used as a function of the time error indication,
- updating each read mask for the next clock stroke, by performing a binary rotation of the current value of said read mask by P, P−1 or P+1 bits depending on whether the time error indication is respectively "nominal", "underrun" or "overrun".

11. The method according to claim 8, wherein reordering the samples to be supplied to the interpolation module in the FIFOs includes:
- a binary rotation operation, on said samples, by a number of bits defined from the current value of the counter,
- updating the counter, for the next clock stroke, by performing a modulo 2×P addition of the current value of the counter with the value P, P−1 or P+1 depending on whether the time error indication is respectively "nominal", "underrun" or "overrun".

12. The method according to claim 8, wherein each FIFO is configured to activate an overflow risk indication when the number of samples stored in said FIFO is greater than or equal to a threshold, and writing to the FIFOs is authorized if and only if the overflow risk indication is not activated for any of the FIFOs.

13. The method according to claim 8, wherein each FIFO is configured to activate a shortage risk indication when the number of samples stored in said FIFO is less than or equal to a threshold, and reading from the FIFOs is authorized if and only if the shortage risk indication is not activated for any of the FIFOs.

14. The method according to claim 8, wherein the symbol frequency at the output of the synchronization device is greater than or equal to 100 Mbits/s.

\* \* \* \* \*